US005785485A

United States Patent [19]
Hall

[11] Patent Number: 5,785,485
[45] Date of Patent: Jul. 28, 1998

[54] SHIFTABLE CARGO CONTAINER FOR TRUCK TRACTOR

[76] Inventor: Larry J. Hall, Site #10, Comp. 63, R.R. 2, Kamloops, British Columbia, Canada, V2C 2J3

[21] Appl. No.: 604,467

[22] Filed: Feb. 21, 1996

[51] Int. Cl.$^6$ .................................................... B60P 1/04
[52] U.S. Cl. .................... 414/498; 414/478; 414/500; 414/529
[58] Field of Search ........................ 414/349, 352, 414/462, 477, 478, 479, 498, 500, 529, 559; 296/35.3, 37.6; 280/DIG. 8

[56] References Cited

U.S. PATENT DOCUMENTS

| 2,529,752 | 11/1950 | Whittle ............................... 414/500 |
| 3,163,306 | 12/1964 | Bennett et al. .............. 280/DIG. 8 X |
| 3,504,814 | 4/1970 | McCleary ........................... 214/515 |
| 3,612,315 | 10/1971 | Blackburn ...................... 414/498 X |
| 3,817,413 | 6/1974 | Ham ................................... 414/498 |
| 4,051,959 | 10/1977 | Staff et al. ..................... 414/352 X |
| 4,580,805 | 4/1986 | Bertolini ....................... 280/405 A |
| 5,040,814 | 8/1991 | Lohr ............................. 296/35.3 X |
| 5,326,212 | 7/1994 | Roberts ............................. 414/347 |
| 5,417,540 | 5/1995 | Cox ............................... 414/498 X |
| 5,467,827 | 11/1995 | McLoughlin .................. 414/550 X |
| 5,624,225 | 4/1997 | Cox ............................... 414/498 X |

FOREIGN PATENT DOCUMENTS

| 0251219 | 1/1988 | European Pat. Off. ............. 414/478 |
| 0316600 | 5/1989 | European Pat. Off. ............. 414/498 |
| 2736222 | 2/1979 | Germany ........................... 296/35.3 |
| 3140902 | 5/1983 | Germany ........................... 296/37.6 |
| 4072225 | 3/1992 | Japan ............................... 414/498 |
| 9008052 | 7/1990 | WIPO ............................... 414/500 |

*Primary Examiner*—James W. Keenan
*Attorney, Agent, or Firm*—Dergosits & Noah LLP

[57] ABSTRACT

A cargo container is fitted to the chassis of a truck tractor so as to be shiftable on rollers between first and second positions. The first position is adjacent the rear of the tractor cab, and the second position is adjacent a rear end of the tractor chassis. The bottom of the container is built with a centred longitudinal channel that allows the container to pass over a fifth wheel of the tractor when being shifted to the second position. The rear side of the container has one or more doors that can be opened when the container has been shifted to the second position and the tractor has been backed into a loading dock. This allows a forklift to be driven directly into the container from the loading dock, facilitating loading and unloading of cargo.

11 Claims, 5 Drawing Sheets

SHIFTABLE CARGO CONTAINER FOR TRUCK TRACTOR

BACKGROUND OF THE INVENTION

1. Field of the Invention

The invention relates to a container for increasing the cargo capacity of a tractor trailer, more particularly to a container shiftable between first and second positions on a tractor of the tractor trailer.

2. Description of the Prior Art

A tractor trailer is an articulated truck having a steerable tractor on the rear of which is mounted a 'fifth wheel' to which the trailer is pivotally connected. The fifth wheel is mounted on a chassis of the tractor to sit approximately above the rear wheels—which may involve a single axle or a pair of tandem axles. The driver area of many modern tractor cabs has conveniences similar to those in automobiles, and some cabs have a sleeping compartment behind the driver area.

In recent years construction of tractor trailers has been modified in various ways to increase cargo-carrying capacity. One modification has involved increasing the length of the chassis of the tractor, and fixing an auxiliary cargo container to the chassis between the cab and the fifth wheel. Sufficient room has to be maintained ahead of the fifth wheel to allow movement of the front end of a trailer during articulation between the tractor and the trailer. One difficulty with fixing a cargo container to the tractor chassis involves loading and unloading of the container.

Whereas a trailer may be easily loaded or unloaded by a forklift driven into it after it has been backed up to a loading dock, the loading or unloading of a cargo container fixed to a tractor chassis ahead of the fifth wheel is not as easily accomplished. Such cargo containers are usually emptied through side doors, which often does not allow for entry of a forklift. It would be advantageous to be able to fill or empty such a container on a truck tractor in a manner similar to that used with a trailer.

It is therefore the object of this invention to demonstrate a cargo container for the tractor of a tractor trailer that is as easy to load and unload as is a trailer of the tractor trailer.

BRIEF SUMMARY OF THE INVENTION

In one form, the invention is an shiftable cargo container adapted to be fitted to a truck tractor having front and rear wheels, a chassis supported on the wheels, a driver cab mounted on the chassis, and a fifth wheel mounted on the chassis behind the cab and approximately above the rear wheels for connecting a trailer. The cargo container is adapted to be fitted to the chassis of the truck tractor so as to be shiftable between a first position adjacent a rear side of the cab and a second position adjacent a rear end of the chassis. The cargo container has a depth in the longitudinal direction of the truck tractor such that in the first position the cargo container is compatible with full angular movement between the truck tractor and a trailer connected to the fifth wheel. A bottom of the cargo container is configured to allow the container to pass over the fifth wheel when the container is shifted between the two positions. A side of the cargo container that faces rearwardly on the truck tractor has at least one door. The cargo container is loaded or unloaded when in the second position, and is shifted to the first position to allow connection of a trailer to the truck tractor.

The height and width of the cargo container may be approximately the same as the height and width of a trailer connectable to the truck tractor.

The container may have two sets of rollers, each set being mounted on the container adjacent a respective opposite side of the container and being adapted to sit on a respective longitudinal track of the chassis when the container is fitted to the truck tractor. In this arrangement, the container or the chassis has a flange means for preventing the container from moving laterally after being fitted to the truck tractor, and the container or the chassis has a retention means for preventing the container from moving upward more than a set distance relative to the chassis after the container is fitted to the truck tractor. The flange means may comprise a flange on an end of each roller, the flange on each roller being on that end of the roller that is closer to the respective side of the container. The retention means may comprise a pair of laterally-extending longitudinal flanges on the chassis, and a series of hooked members connected to the container. Each of the vertical members has a vertical portion extending downwardly from the container, and has a lower hooked end extending inwardly towards the chassis at a position below one of the longitudinal flanges. The hooked ends are adapted to catch on the bottom of the longitudinal flanges to limit upward movement of the container relative to the chassis.

The container may be shiftable by means of a drive means connected below the container and the chassis. The drive means has a manually rotatable drum mounted on either the container or the chassis, and also has at least one cable extending around the drum to maintain a friction engagement with the drum. If the drum is mounted on the container, the ends of the cable are secured to the chassis, and vice versa. The drum may be rotatably mounted on the underside of the container to extend laterally thereacross.

The cargo container may be maintained in the first position or the second position by means of a securement means. Part of the securement means is a bolt mechanism fitted to the chassis between a withdrawn position and an extended position. Another part of the securement means is formed by at least two brackets each extending downwardly from the container at a respective longitudinal position on the container and having an aperture adapted to receive the bolt. The bolt is adapted to be extended through the aperture in one of the brackets when the container is in the first position, and is adapted to be extended through the aperture in another of the brackets when the container is in the second position.

In another form, the invention is a truck tractor that is fitted with the cargo container above described.

BRIEF DESCRIPTION OF THE DRAWINGS

The invention will next be described by means of a preferred embodiment utilizing the accompanying drawings, in which.

DESCRIPTION OF THE PREFERRED EMBODIMENT

Figure 1:
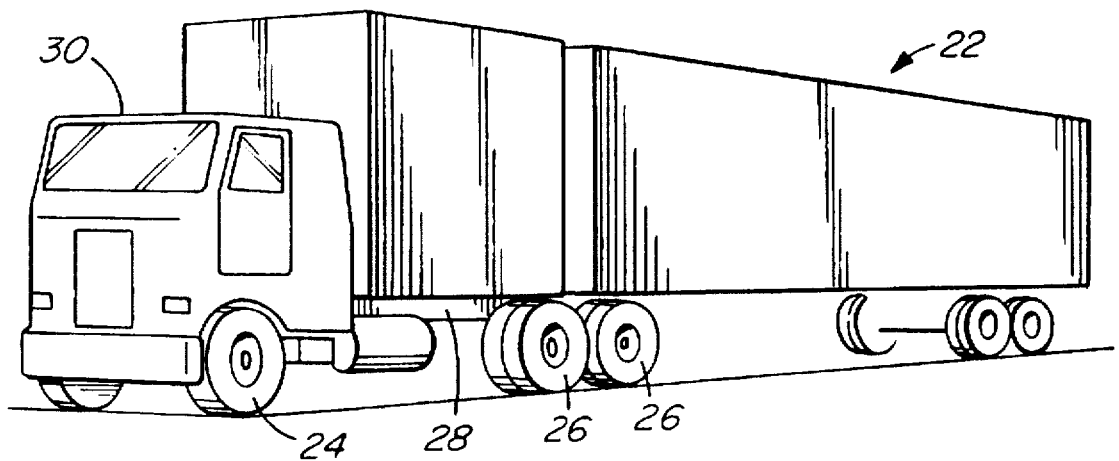
FIG. 1 is a front perspective view of a tractor and a connected trailer, the shiftable cargo container of the invention having been fitted to the tractor.
Figure 2:
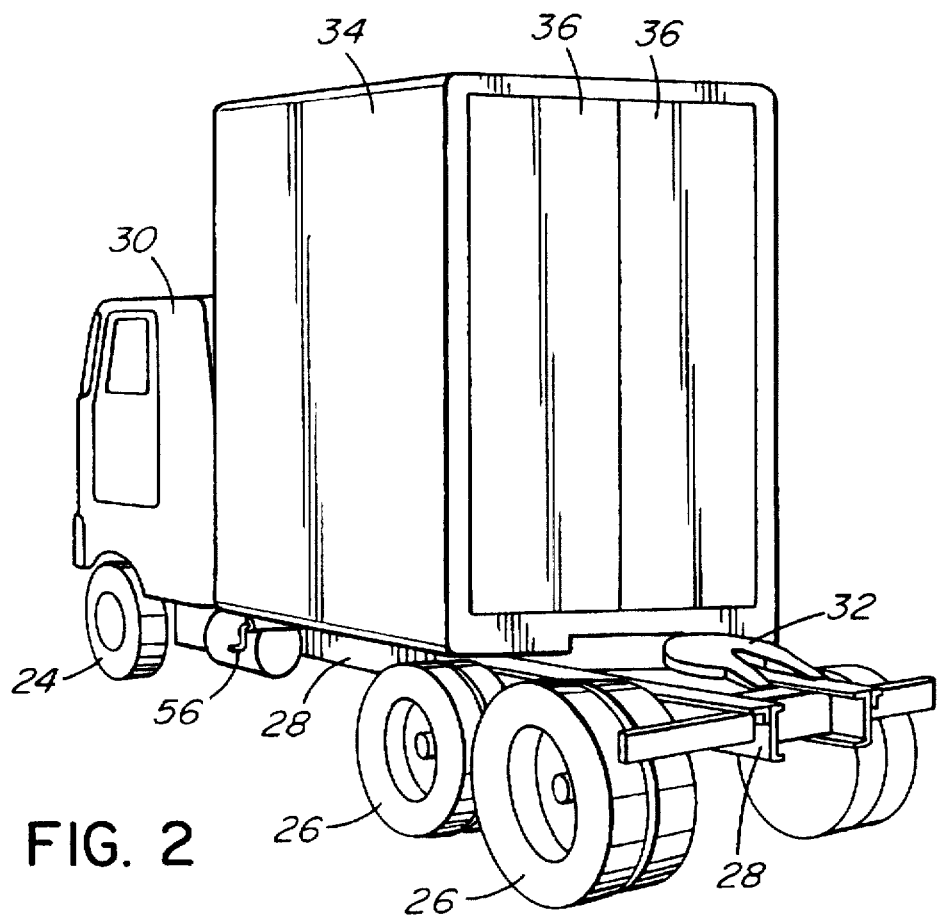
FIG. 2 is a rear perspective view of the tractor of FIG. 1, the container being shown in the first position.

A tractor trailer in FIG. 1 has a tractor generally designated 20 and a trailer generally designated 22. The tractor 20 has a set of steerable front wheels 24 and a tandem pair of driven rear wheels 26. A chassis 28 is suspended on the front and rear wheels. On the forward end of the chassis 28 is mounted a cab 30, and proximate the rear end of the chassis 28 generally above the rear wheels 26 is mounted a fifth wheel 32. A cargo container 34 is also mounted behind the cab 30 on the forward position shown in FIG. 2, in which the cargo container 34 is located adjacent said cab 30, and forward from the fifth wheel 32, and a second or rearward position shown in FIG. 3, in which the cargo container 34 overlies the fifth wheel 32 and the rear wheels 26. The rear side of the container 34 has a pair of rear doors 36 for loading and unloading the container through the rear doors 36.

Figure 4:
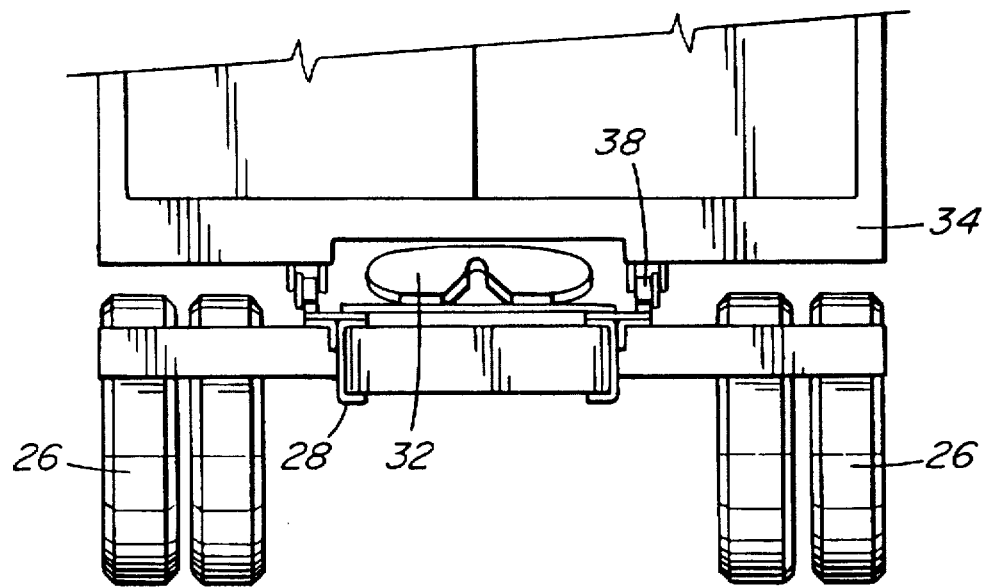
FIG. 4 is a rear view of a lower portion of the tractor of FIG. 1.
Figure 5:
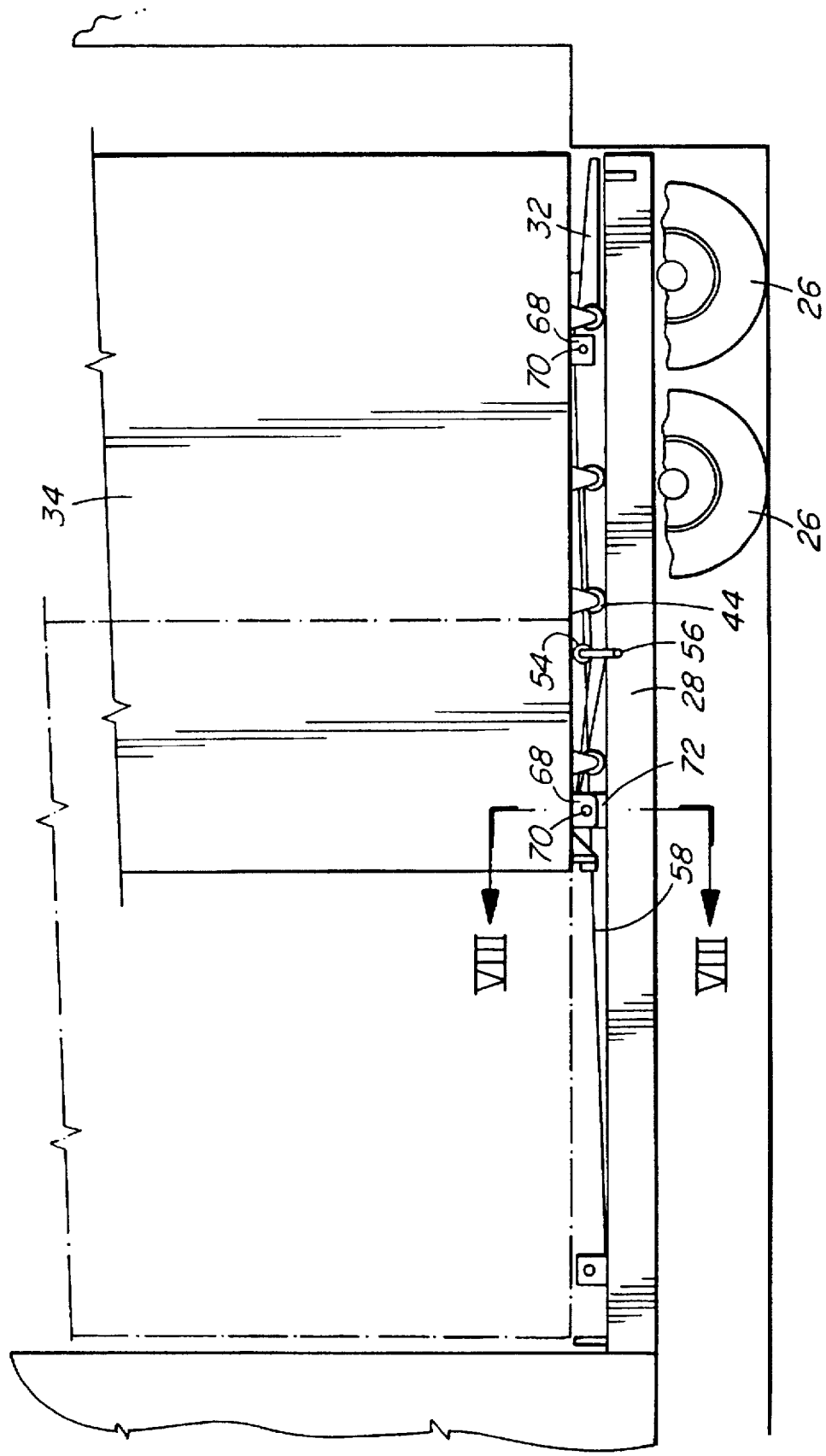
FIG. 5 is a side view of a rear portion of the tractor of FIG. 1, the shiftable cargo container being shown in the second position.
Figure 6:
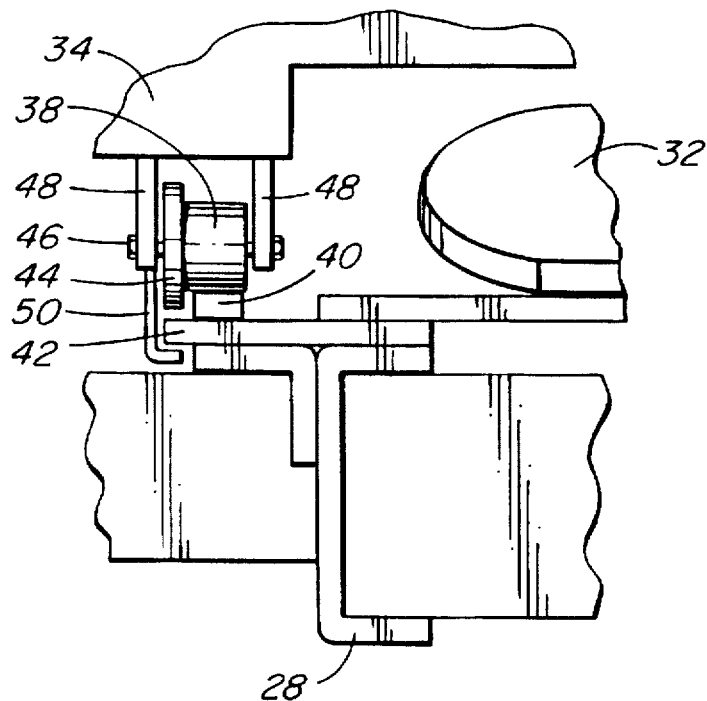
FIG. 6 is an enlarged view of that portion of FIG. 4 showing a portion of the fifth wheel, one of the rollers on the container, and a longitudinal track on the chassis on which the roller sits.

As shown in FIGS. 4, 5 and 6, the cargo container 34 has two sets of rollers 38 mounted to its underside, each set being laterally positioned approximately halfway between a centerline of the container 34 and a respective one of the sides of the container. As best shown in FIG. 6, each set of rollers 38 sits on a longitudinal track 40 that sits on a respective lateral extension 42 of the chassis 28, the tracks 40 and the rollers 38 forming a support mounted on the chassis 28 and permitting displacement of the cargo container 34 between the forward and rearward positions.

Each of the rollers 38 has an outer flange 44, the flanges 44 limiting lateral movement of the rollers 38 on the longitudinal tracks 40. An axle 46 extending through each roller 38 has its ends supported by a pair of legs 48 extending downward from the underside of container 34. To an outer one of the legs 48 is secured a hooked member 50, which extends downwardly and then inwardly under a portion of the respective lateral extension 42 of chassis 28 to prevent the container 34 from moving upwardly from the chassis 28. This construction prevents each roller 38, and thus container 34, from upward movement relative to the chassis 28.

Figure 3:
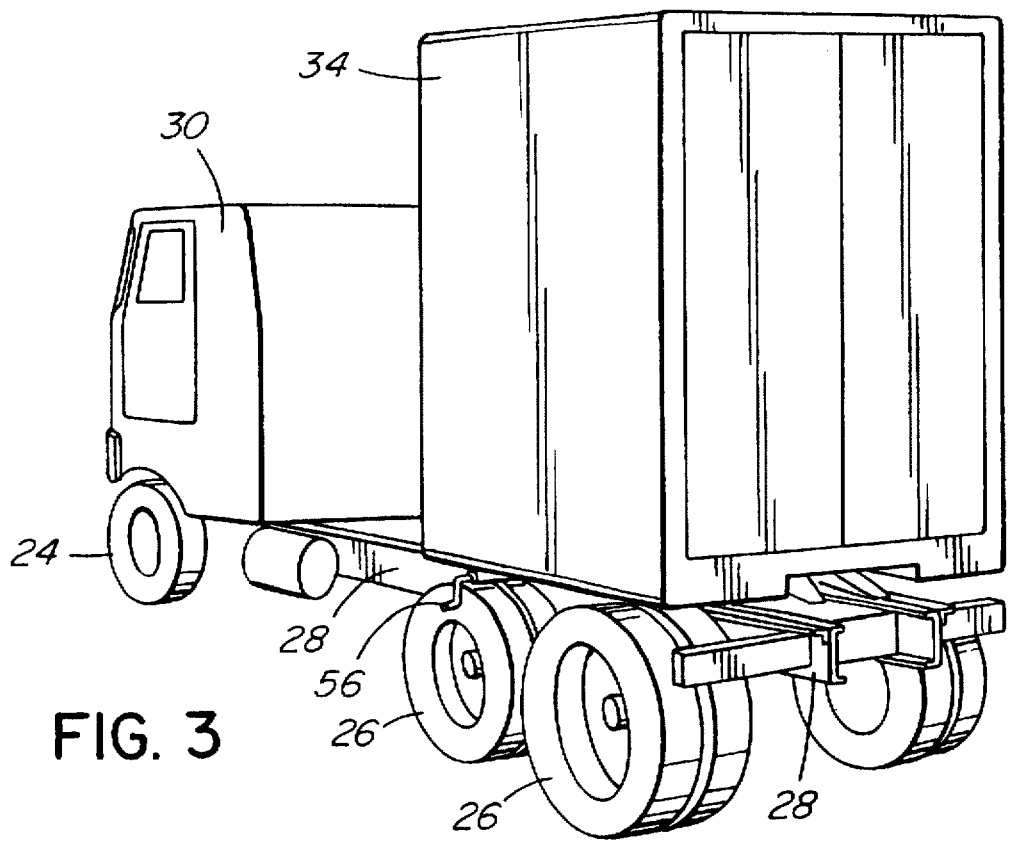
FIG. 3 is a rear perspective view of the tractor of FIG. 1, the view being similar to FIG. 2 but showing the container in the second position.

As shown in FIGS. 3, 4 and 6, a central portion of the bottom of the container 34 sits higher than the rest of the bottom. This allows the container 34 to pass above the fifth wheel 32 when longitudinally shifted on the chassis 28. However, it would alternatively be possible to provide the container 34 with a flat bottom, although this would reduce the interior height of the container 34.

Figure 7:
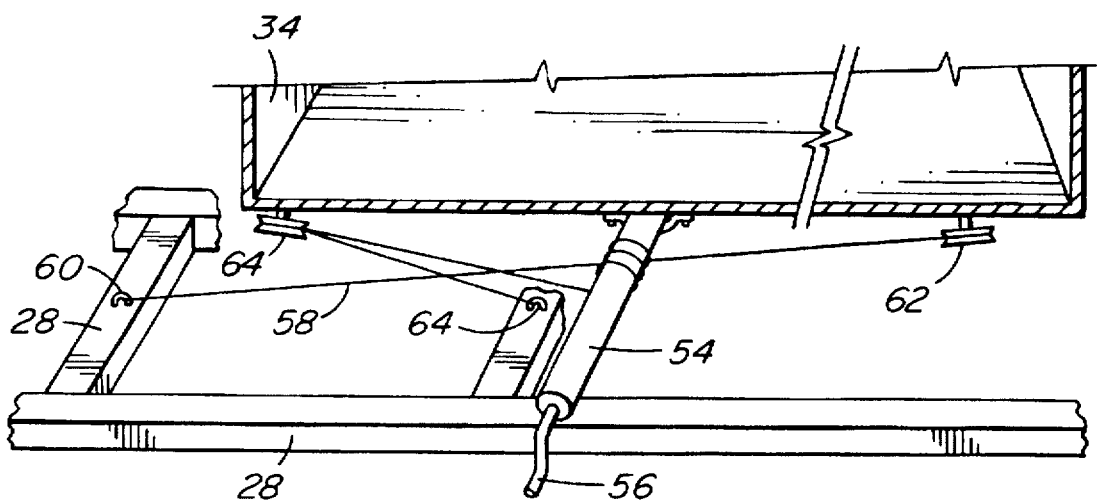
FIG. 7 is a partially-sectioned perspective view of the container and the chassis on which it is fitted, the drive means being shown for shifting the container between the first and second positions; and, FIG. 8 is a sectioned view of a portion of the bottom of the container and an adjacent portion of the chassis, the view being taken along the line VIII-VIII of FIG. 5 and showing the securement means for holding the container in either the first or second position.

FIG. 7 illustrates a drive means for shifting the container 34 longitudinally on the chassis 28. The drive means consists of a drum 54 rotatably mounted to the bottom of container 34 to extend laterally thereacross. A handle 56 is connected to one end of the drum 54 to extend out of the vertical plane of one side of container 34. A cable 58 extends from a first point 60 on the chassis 28, around a first pulley 62 on container 34, then several times around the drum 54 before passing around a second pulley 64 on the container 34 to a second point 65 on the chassis 28. With this arrangement, rotating the handle 56 causes container 34 to move longitudinally on chassis 28.

Figure 8:
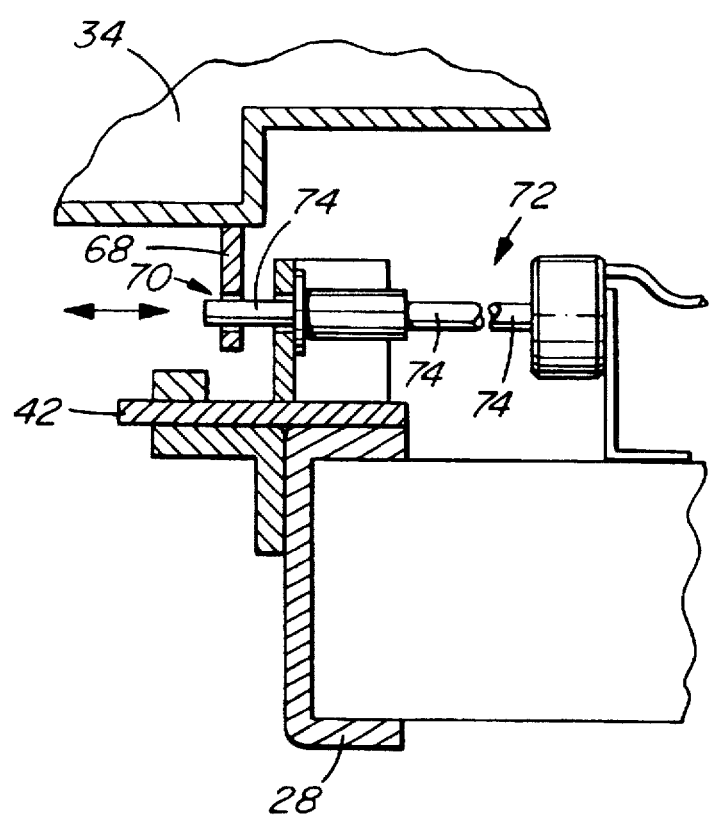

As best shown in FIGS. 5 and 8, two brackets 68 extend downwardly from the underside of each side of the container 34, approximately in-line with the inner legs 48 supporting the rollers 38. Each bracket 68 has a centred aperture 70. Pneumatic or hydraulic actuators 72 fitted to opposite sides of the chassis 28 reversibly move respective bolts 74 for engaging the holes 70 (depending on the position of the container 34). As shown in FIG. 5, if the container 34 is in the second a rearward position, bolts 74 engage apertures 70 of brackets 68 at a forward location on container 34 at each side of the container; if the container 34 is in the first a forward position, bolts 74 engage apertures 70 of bracket 68 at a rearward location on container 34. When the container 34 is to be shifted from either the first or the second position, the actuators 72 withdraw the bolts 74 from the apertures 70. Once the container 34 has been shifted to the alternate position, the actuators 72 move the bolts 74 through the apertures 70 of the brackets 68 that have become adjacent. The bolts 74, with their actuators 72, and the brackets 68 thus form a locking device for locking the cargo container 34 in position on the chassis 28.

In the present embodiment of the invention, the container 34 is manufactured for installation onto a conventional truck chassis, which is modified as described above, the parts 28–32 being parts of the conventional chassis.

As will be apparent to those skilled in the art, various modifications may be made in the present invention within the scope of the appended claims.

I claim:

1. A truck tractor comprising:

a chassis;

a driver cab mounted on said chassis;

a fifth wheel mounted on said chassis behind said driver cab for connecting a trailer to truck tractor;

a cargo container mounted on said chassis behind said driver cab;

container supports mounted on said chassis and permitting displacement of said cargo container longitudinally of said chassis on said supports between a forward position, in which said cargo container is located adjacent said driver cab and forward from said fifth wheel, and a rearward position, in which said cargo container overlies said fifth wheel;

said cargo container having rear doors to permit loading and unloading of said cargo container through said rear doors;

a drive operable to shift said cargo container to and fro, longitudinally of said chassis, between said forward and rearward positions; and a locking device operable to lock said cargo container in position relative to said chassis.

2. A truck tractor as in claim 1, wherein said supports comprise a pair of mutually spaced tracks extending longitudinally of said chassis, said cargo container having rollers supporting said cargo container on said tracks and said cargo container thereby being shiftable to and fro along said tracks, between said forward and rear positions, by rolling of said rollers along said tracks.

3. A truck tractor as in claim 2, wherein said rollers have flanges engageable with said tracks for preventing movement of said cargo container laterally of said tracks.

4. A truck tractor as in claim 1, further comprising retention means for retaining said cargo container against upward removal from said chassis.

5. A truck tractor as in claim 1, wherein said drive comprises a rotatable drum and cable means for winding said cargo container along said chassis.

6. A truck tractor comprising:

a chassis;

rear wheels and steerable front wheels supporting said chassis;

a driver cab mounted on said chassis;

a fifth wheel mounted on said chassis behind said driver cab and approximately above said rear wheels for connecting a trailer to said truck tractor;

a cargo container mounted on said chassis behind said driver cab;

container supports mounted on said chassis and permitting displacement of said cargo container longitudinally of said chassis on said supports between a forward position, in which said cargo container is located adjacent said driver cab and forward from said fifth wheel, and a rearward position, in which said cargo container overlies said fifth wheel and said rear wheels;

said cargo container having rear doors to permit loading and unloading of said cargo container through said rear doors;

a drive operable to shift said cargo container to and fro, longitudinally of said chassis, between said forward and rearward positions; and a locking device operable to lock said cargo container in position relative to said chassis.

7. A truck tractor as in claim 6, wherein said supports comprise a pair of mutually spaced tracks extending longitudinally of said chassis, said cargo container having rollers supporting said cargo container on said tracks and said cargo container thereby being shiftable to and fro along said tracks, between said forward and rear positions, by rolling of said rollers along said tracks.

8. A truck tractor as in claim 7, wherein said rollers have flanges laterally engageable with said tracks for preventing movement of said cargo container laterally of said tracks.

9. A truck tractor as in claim 6, further comprising retention means for retaining said cargo container against upward removal from said chassis.

10. A truck tractor as in claim 6, wherein said drive comprises a rotatable drum and cable means for winding said cargo container along said chassis.

11. A truck tractor as in claim 6, wherein said cargo container has a recessed underside for accommodating said fifth wheel on displacement of said cargo container into said rearward position.

\* \* \* \* \*